J. DUNN.
DIRECTION INDICATOR FOR MOTOR AND OTHER VEHICLES.
APPLICATION FILED MAR. 1, 1915.
1,142,505. Patented June 8, 1915.
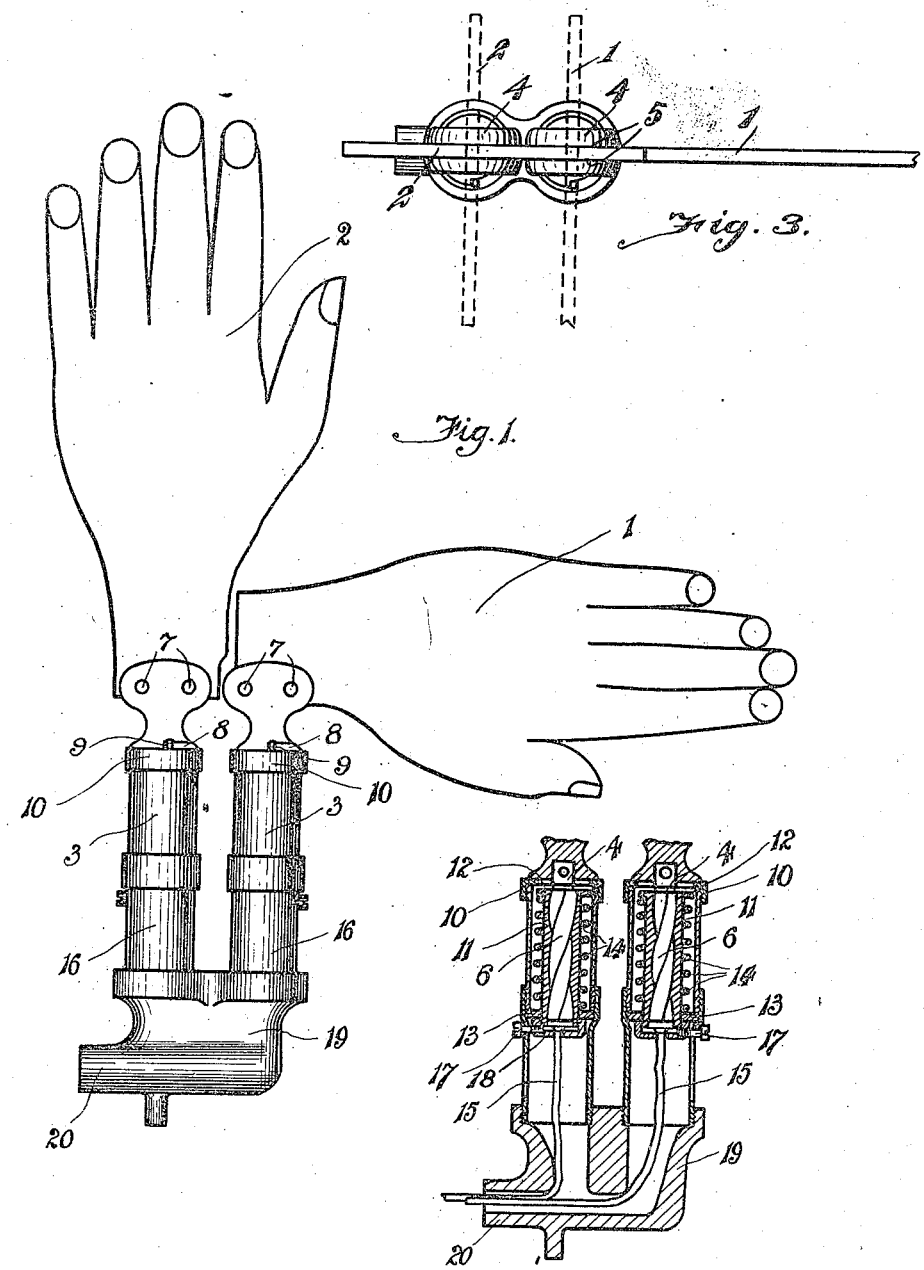

UNITED STATES PATENT OFFICE.

JOSEPH DUNN, OF BIRMINGHAM, ENGLAND.

DIRECTION-INDICATOR FOR MOTOR AND OTHER VEHICLES.

1,142,505. Specification of Letters Patent. Patented June 8, 1915.

Application filed March 1, 1915. Serial No. 11,403.

*To all whom it may concern:*

Be it known that I, JOSEPH DUNN, subject of the King of Great Britain, residing at 317 Warwards Lane, Selly Oak, Birmingham, in the county of Worcester, England, have invented a new and useful Improvement in Direction-Indicators for Motor and other Vehicles; and I do hereby declare the following to be a full, clear, and exact description of the same.

My invention comprises improvements in direction indicators for motor and other vehicles, *i. e.* indicators located in such positions that they may be seen from the rear of the vehicle and intended to indicate to another driver or person at the rear of the vehicle the fact that the driver is about to stop or slacken speed or to turn and the direction of such turning, the object of the present invention being to provide an improved indicator of this kind.

According to this invention I provide an indicator for motor or other vehicles comprising means for showing a hand in a horizontal position as an indication that the vehicle is about to turn, in combination with means for showing another hand in a vertical position as an indication that the vehicle is about to stop, said means being under the control of the driver and visible from the rear of the vehicle, and both hands being adapted to turn from a plane parallel with the axis of the vehicle to a plane at right angles thereto.

In a preferred form of the invention the two indicators are mounted upon a single casting carried by the vehicle and are disposed one in front of the other, tandem-fashion, preferably the left-hand side (in U. S. A. and places where the traffic keeps to the right side of the road, with reference to which the invention will be described, but otherwise as for example in England preferably upon the right-hand side) and one indicator is adapted to show a horizontally disposed hand or the like, while the front indicator nearer to the vehicle may be adapted to show a vertically disposed hand or other indication that it is the intention of the driver to slow down or stop. It will be clear that when the vehicle is turning to the right no indication is really required by a driver behind the vehicle, since he would not in any case be passing the vehicle upon the inside.

Referring to the drawings. Figure 1. is an elevation of apparatus made according to the preferred form of my invention. Fig. 2. is a sectional view of the same. Fig. 3. is a plan.

In carrying my invention into practice as illustrated upon the accompanying drawings a horizontal hand 1 is shown together with a vertical hand 2 both mounted by means of rivets in suitably shaped forked members. The operating mechanism for each hand includes a vertical tubular body member 3 in which the pointer, which may be made of aluminium and is shown shaped like a hand, is carried by a suitable spindle 4 in combination with suitable mechanism whereby when a lever or pedal is operated the indicator is moved from a position in alinement with the direction in which the vehicle is traveling so as to occupy a position at right angles thereto.

The indicating member 1 or 2 is carried in a slot 5, cut in the top of the spindle 4, the main part of the spindle being formed after the manner of an Archimedean screw 6 the indicating member being held in the slot by means of suitable rivets 7, the said spindle being provided with a slot 8 formed in the flange of the forked top and engaging with a stop 9 on the stationary part of the apparatus so as to limit the turning movement of the spindle and indicator to 90 degrees. As shown the stop 9 is formed in a cover 10 adapted to screw upon the tubular body portion 3.

Within the aforementioned tubular body portion is a sliding sleeve or long nut 11 through which the Archimedean screw passes this nut having a projecting flange 12 on its upper end between which and an internal flange 13 on the body portion, a spiral spring 14 is located this spring tending to press the nut up to the top the whole being so arranged that when the sleeve is drawn down the indicating member is turned through 90 degrees *i. e.* to a position at right angles to that of the direction of the vehicle being immediately returned to its normal position by the spring as soon as the control is released.

Any suitable controlling means may be employed but I preferably employ a stranded wire or Bowden wire mechanism connected to the lower extremity of the sleeve and indicated at 15.

The portion 3 is attached to a base 16 which may be provided with a slot for a pin 17 carried by the portion 18 to which the actuating wire is attached and which is screwed to the nut 11. The actuating wires are attached to the portion 18 by passing the wires through apertures in the center of the portion 18 which are only slightly larger than the wire and then enlarging the end of the wire as by riveting.

Obviously two separate controls will be used, the indicating members being employed for different purposes as set forth above.

An important feature of the present invention is the combination of the two indicating members tandem fashion and in close proximity upon a single casting, each being screwed into a hole formed in the boss 19 and the controlling wires passing forward through the branch 20.

The hands as shown may be painted red and may be arranged with lights to shine through them or upon them at night and to act as reflectors.

What I claim then is:—

1. In an indicating device for motor and other vehicles the combination of a hollow base member; a hollow vertical casing fixed to said base member and provided with a vertical slot; a nut adapted to slide in said vertical casing; a screw rotatably mounted in said vertical casing and coacting with said nut; a pin attached to said nut and working in the slot in said vertical casing; a hand operatively connected to said screw and adapted to rotate therewith; a wire attached to said nut passing through said hollow base member and adapted to draw the same down within the said vertical casing; and a spring adapted to raise the said nut into its normal position.

2. In an indicating device for vehicles, the combination of a support, a hollow casing fixed to said support and provided with a longitudinal slot, a nut adapted to slide in said casing, an interior flange carried by the casing and through which said nut projects, a member secured to the end of said nut where it projects through said flange, a screw secured to said member and projecting through the slot in the casing, means adapted to move said nut in one direction longitudinally of the casing, and a spring arranged to press against said flange and adapted to return the said nut into its normal position.

In testimony whereof I affix my signature in presence of two witnesses.

JOSEPH DUNN.

Witnesses:
  E. L. V. BYRNE,
  G. L. FORRESTER.